United States Patent [19]
Dunn
[11] Patent Number: 4,513,434
[45] Date of Patent: Apr. 23, 1985

[54] X-RAY REFLECTIVE OPTICAL ELEMENTS

[75] Inventor: Aubrey J. Dunn, Springfield, Va.

[73] Assignee: The United States of America as represented by the Secretary of the Army, Washington, D.C.

[21] Appl. No.: 447,724

[22] Filed: Dec. 7, 1982

[51] Int. Cl.³ .............................................. G01N 23/20
[52] U.S. Cl. .......................................... 378/85; 378/82
[58] Field of Search .............................. 378/84, 85, 82

[56] References Cited

U.S. PATENT DOCUMENTS 3,160,749 12/1964 Spielberg .............................. 378/85

*Primary Examiner*—Craig E. Church
*Attorney, Agent, or Firm*—Anthony T. Lane; Max L. Harwell; Aubrey J. Dunn

[57] ABSTRACT

An echelon arrangement of Bragg-angle X-ray or gamma ray reflectors using crystals. Each successive member of the echelon has one more crystal than the preceeding member. Thus, each ray of an incident X-ray or gamma ray beam is reflected by a different amount and the reflected rays may be directed through a common focal point.

2 Claims, 1 Drawing Figure

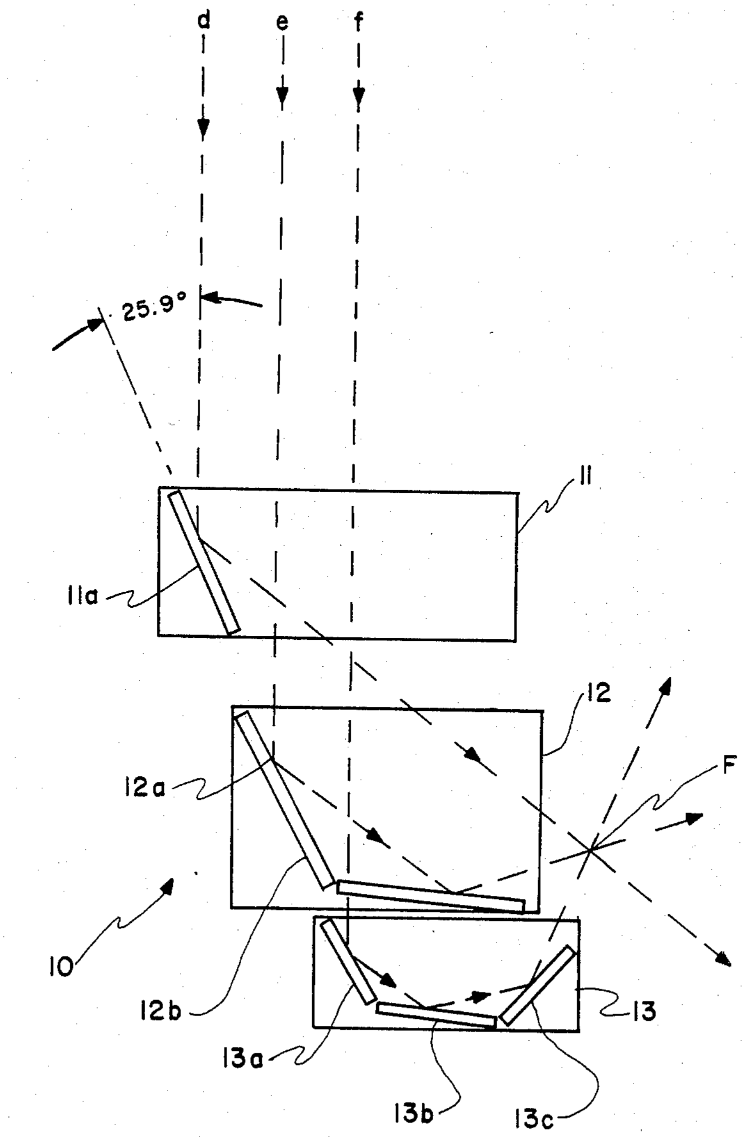
d
e
f
25.9°
11
11a
12
12a
F
10
12b
13
13a
13b
13c

X-RAY REFLECTIVE OPTICAL ELEMENTS

The invention described herein may be manufactured, used, and licensed by the U.S. Government of governmental purposes without the payment of any royalties thereon.

BACKGROUND OF THE INVENTION

This invention is in the field of optical elements such as lenses for X-ray and other penetrating radiations, including gamma rays. Until this invention, the primary manner by which such radiations have been focused is by using so-called "grazing" optics. These optics are plane or curved surfaces from which the radiations reflect for a very shallow angle of incidence. Although Bragg angle reflectors for X-rays and other penetrating radiations are known, their uses have been mainly in X-spectrometers and X-ray lasers. In the case of spectrometers, the reflectors are used to direct incoming radiation onto a detector; in lasers; the reflectors are used to define the resonate cavity of the laser. None of the known x-ray optics are capable of changing focus, which the instant invention can do.

SUMMARY OF THE INVENTION

The invention is an X-ray optical element consisting of an array of reflectors. Each reflector is a Bragg angle reflector and reflects a portion of an incident X-ray. The reflectors are preferably in an echelon arrangement and each include one or more crystal surfaces arranged such that the incident X-ray on each surface has an angle of incidence equal to the Bragg angle for the particular crystal and X-ray wavelength. If the distance between the reflectors is varied, the apparent focal length of the element is varied.

BRIEF DESCRIPTION OF THE DRAWING

The single drawing FIGURE is an end view of an embodiment of the invention, with X-rays indicated with dashed lines.

DESCRIPTION OF PREFERRED EMBODIMENT

The invention may be best understood when this description is taken in conjunction with the drawing. In the drawing, reference numeral 10 generally indicates the inventive optical element. This element includes a three member echelon arrangement of reflectors 11, 12 and 13 which respectively reflect incoming parallel rays d, e, and f of an incident X-ray beam. It should be understood that these rays are merely exemplary and are used for the purpose of illustration, and that many other rays would be incoming parallel to d, e, and f. Each reflector is a parallelepiped solid body of material transparent to X-rays, with one or more crystal reflectors extending through the body.

Reflector 11 has crystal 11*a* therein; ray d is reflected from 11*a* and passes through focal point F. The angle of incidence of ray d onto 11*a* is the Bragg angle for the particular crystal and ray wavelength. Ray e enters reflector 12, is reflected by both crystals 12*a* and 12*b*, and also passes through focal point F. Ray f enters reflector 13, is reflected by crystals 13*a*, 13*b*, and 13*c*, and passes through focal point F. The drawing as shown is for x radiation of 1.1 Å wavelength, and crystals 11*a*, 12*a*, 12*b*, 13*a*, 13*b*, and 13*c* are sodium chloride. The Bragg angle for this wavelength-crystal combination is 25.90. The size and placement of the reflector crystals was determined empirically by drawing rays d, e, and f by making transparent overlays of the final reflection angles of the rays, and by placing these overlays over the drawn rays and moving the overlays around to have all reflected rays pass through arbitrary focal point F. If reflectors 11–13 are moved with respect to each other and to the incoming rays, point F also moves. Naturally, with only three reflectors, one obtains a very low resolution line image; in order to improve resolution, one chooses a crystal with a relatively small Bragg angle, and use more reflectors for a given incoming beam size. Obviously, the rays of the X-ray beam reflected by optical element 10 will be polarized at the first reflection of a ray from a crystal. The invention is also usable with gamma rays, as well as X-rays, and the same techniques for gamma ray Bragg-angle reflectors may be used.

Although the invention has been described as an optical element capable of focusing a beam of parallel X-rays or gamma rays, it also may be used to collimate a point source of X-rays or gamma rays by placing the source at focal point F. For converging incident rays, the reflectors may be arranged to collimate or diverge the rays.

I claim:

1. A reflective optical element for incident penetrating electromagnetic radiation including an echelon array of reflectors for the radiation, wherein each reflector includes at least one crystal at the Bragg angle for the incident radiation, and successive members of said echelon have a successively greater number of crystals.

2. The optical element as set forth in claim 1 wherein said radiation may be considered as including a plurality of rays propagating in particular directions, and wherein, respective ones of said rays impinge on respective ones of said reflectors and are reflected thereby, and wherein, for a reflector having more than one crystal, the respective ray impinging thereon is successively reflected by each successive crystal, such that every respective ray is reflected from its particular direction in direct relation to the number of crystals of each reflector.

* * * * *